Aug. 16, 1966

C. V. EVANS 3,266,516

AMPLIFIER RELAY FOR PNEUMATIC SYSTEMS

Filed Dec. 18, 1962

INVENTOR.
CHARLES V. EVANS
BY
John F. Luhrs
ATTORNEY

United States Patent Office 3,266,516
Patented August 16, 1966

3,266,516
AMPLIFIER RELAY FOR PNEUMATIC SYSTEMS
Charles V. Evans, Euclid, Ohio, assignor to Bailey Meter Company, a corporation of Delaware
Filed Dec. 18, 1962, Ser. No. 245,562
3 Claims. (Cl. 137—86)

This invention relates to a pneumatic power amplifier used in systems and apparatus wherein a fluid pressure is established representative of that which is to be measured or controlled, the fluid pressure to be used to actuate an exhibiting or controlling device.

My invention is particularly adapted and useful in pneumatic telemetering systems using air pressure as the active fluid. This is not meant as a limitation on the invention since it is also adaptable to other fluids. For descriptive purposes only I have chosen to describe my invention in terms of apparatus using air pressure.

It will be apparent as the description proceeds that the invention may be put to a wide variety of uses such as for exhibiting the value of a temperature, pressure, relative humidity, electromotive force, or for transmitting commands or other intelligence, all of which are to be considered as coming within the scope of the invention.

Prior to my invention the many and varied amplifiers, of the type described herein and known in the art, suffered in their accuracy as a result of adverse effects due to supply pressure variations. My improved amplifier eliminates all but a very small effect on the output signal due to such supply variations. Broadly speaking I employ the supply pressure to establish the amplifier operating setpoint. If the supply pressure varies the operating point of my amplifier varies but there is little noticeable effect on the output signal. Since all prior amplifiers of the type herein described use a spring to establish the operating setpoint it might be said I employ a spring with a variable spring rate.

A particular object of my invention is to provide a pneumatically operated power amplifier whereby the output signal is a true indication of the measured variable and not effected by unavoidable supply pressure variations.

Another object is to provide apparatus whereby a relatively weak force, representative of a condition, or position is amplified in translation into a pneumatic or similar fluid pressure and the amplified fluid pressure is made available for actuating the exhibiting or controlling apparatus relatively adjacent or relatively remote from the measuring means. In this way a sensitive measuring instrument may be located adjacent the point of measurement and the resulting measurement may be amplified and transmitted over considerable distances to a desirable location for exhibiting or controlling apparatus. By transmitting the measurement through the agency of a pneumatic loading pressure, there is avoided the many inaccuracies and time lags which have been experienced in the past with systems wherein the measuring instrument itself must of necessity be located on a panel board a considerable distance from the location of the variable which is to be measured.

A further object of this invention is to provide a controller wherein the telemetered signal is modified in accordance with a predetermined program. Such modification being known in the art as integral, proportional plus reset, proportional and derivative action.

Another object of my invention is to provide a telemeter transmitter of universal applicability wherein variables, positions, and the like are converted to within a standard range of air pressure for remote or local transmitting.

These objects and advantages as well as others will become apparent from the following description in connection with the accompanying drawings wherein.

Figure 1:
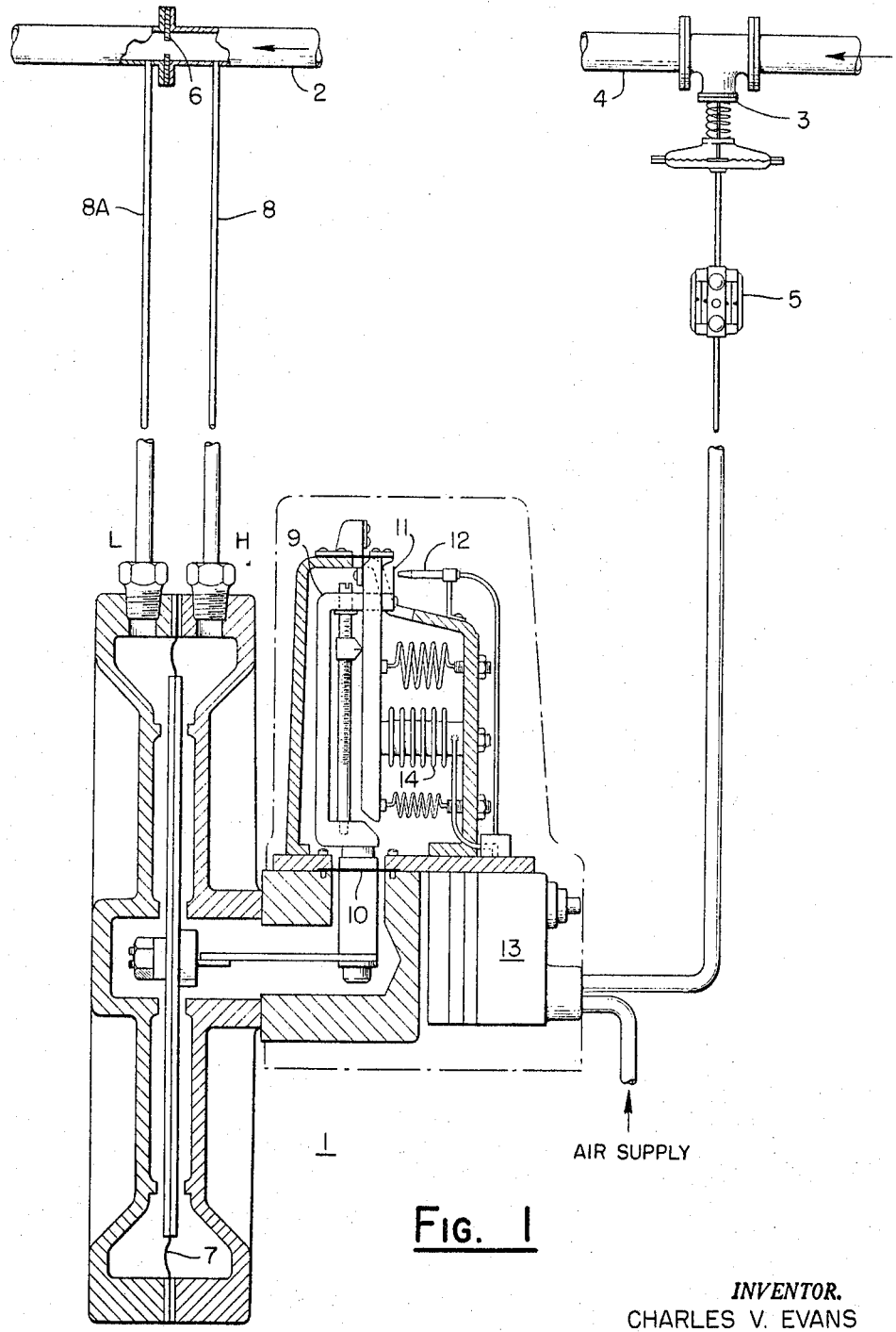
FIG. 1 illustrates an embodiment of the invention in a simple control system.

Referring to FIG. 1, I show a simple control system in which a transmitter using the subject amplifier is employed. This operative fluid control system includes a transmitter, selector station and a controller. The transmitter 1 is desirably located adjacent to the point of measurement, in this case close to the fluid flow pipe 2. The telemetered signal controls a control valve 3 used for controlling the rate flow through a pipe 4. Intermediate between the transmitter 1 and the control valve 3 is a selector station 5. Selector station 5 may be of the type disclosed and claimed in P. S. Dickey et al. Patent 2,729,222. Use of the pneumatic selector station 5 provides the possibility of having the control valve 3 automatically positioned by the fluid pressure generated in transmitter 1, or selectively to disconnect the transmitter and remote hand-position the control valve 3.

While the amplifier, and other features of the present invention, will be discussed in connection with the transmitter 1 it will be understood that they are applicable to other devices such as relays, controllers and the like in fluid measuring systems. Also while I specifically illustrate and describe the transmitter 1 as being sensitive to fluid flow, it is important, initially, to appreciate that the transmitter 1 may be sensitive to a wide variety of variables such as pressure and the like for converting the same to a standardized telemetering fluid pressure. In my description I use a telemetering signal pressure of 3 to 27 p.s.i., it being understood that some other pressure range might have been selected.

In the general operation of the system of FIG. 1 the flow in pipe 2 is measured by means of a pressure differential across an orifice 6. The pressure differential is conveyed to opposite sides of a diaphragm 7 of the transmitter 1 by two pipes 8 and 8a. Movement of the diaphragm 7, due to variations in the pressure differential, is conveyed to one end of a force beam 9. This beam passes through a sealing means, such as a diaphragm 10, which in addition to sealing the high pressure chamber also acts as a fulcrum for the force beam 9. The opposite end of the force beam 9 carried the vane 11, of a vane-nozzle fluid pressure couple. The nozzle 12 of this couple is rigidly fastened to the transmitter housing and a pipe extends from the nozzle to the amplifier 13.

The vane 11 is maintained in space relationship with the nozzle 12 and any change in this relationship causes the output of the amplifier 13 to change accordingly. This output pressure is fed back to a bellows 14 for restoring the position of the force beam 9 and returning the original relationship between the vane 11 and the nozzle 12. The output pressure is also transmitted to an indicating means as illustrated in the selector station 5 and/or to a control element such as control valve 3.

It is well known to those skilled in the art that force balance transmitters of the type shown in FIG. 1 are inherently very sensitive to changes in pressure differential, or any means developing the force to be telemetered. These transmitters have a very fast response and their force beam movement is relatively small. It is a general characteristic of these transmitters to be rather unstable and subject to force beam oscillations. This, of course, produces undesirable results in a fluid telemetering system.

When amplifiers of the proportional gain type, such as illustrated and disposed in Gorrie et al. 2,737,963, are used in conjunction with force balance transmitters stabilization of the transmitter is achieved by providing the beam with some form of dampening force. Stabilization is achieved, of course, but the dampening means reduces the sensitivity and slows down the response of the transmitter. In the conception of a previous amplifier, disclosed in United States Patent 2,974,674 issued to B. H. Baldridge, a dynamic analysis made it evident that an amplifier having a low gain would tend to stabilize the force balance transmitter. However, use of low gain would force the acceptance of a relatively large geared range of vane-nozzle movement. With a relatively large geared ranged of the vane-nozzle movement the effects of heavy spring rates at the takeout seal resulted in non-linear performance and loss of sensitivity. Theoretically, the solution lay in overcoming the undesirable characteristics by providing a high gain amplifier. The problem solved by Baldridge as disclosed in United States Patent 2,974,674, was one of supplying an amplifier with both high and low gain.

Baldridge's amplifier overcame the problem of gain and response but it is affected by supply pressure variations. What I propose is an amplifier that has variable gain and is relatively unaffected by supply pressure variation. To accomplish this objective I have added a setpoint chamber and replaced the setpoint spring. A detail description of my improvement will be given presently.

Description of amplifier

Figure 2:
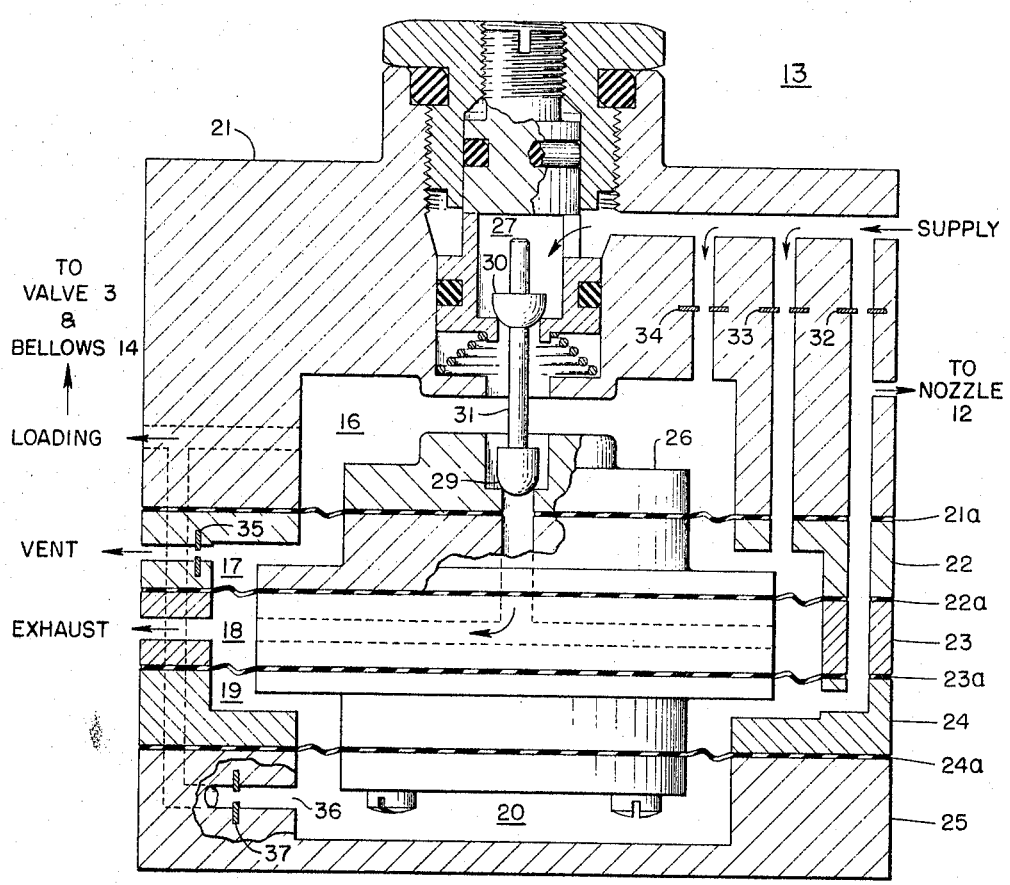
FIG. 2 is a sectional elevation of an amplifying relay embodying the invention.

FIG. 2 is a sectional elevation of the amplifier 13 of FIG. 1, given in a simple schematic arrangement for purposes of illustrating its function and the basic relationship between its parts. Basically the body of the amplifier consists of five parts fitted together to form a cavity. These five parts are designated 21, 22, 23, 24 and 25. Clamped between these individual housing parts are four diaphragms 21a, 22a, 23a and 24a, which in conjunction with the housing parts form five pressure chambers. These chambers are designated as a first loading chamber 16, setpoint chamber 17, exhaust chamber 18, nozzle chamber 19 and second loading chamber 20. The diaphragms are clamped together by a multisection body 26 and thereby move as a single unit.

In the upper three portions of the multisection body 26 are passages, as indicated, to form an atmospheric exhaust for the first loading chamber 16 through the exhaust chamber 18. Exhaust valve 29, positioned within this exhaust passage, controls the venting of the first loading chamber 16.

To develop the required output pressure of the amplifier, the first loading chamber 16 is valved to a source of air supply. This supply enters a supply chamber 27 and is controlled by a supply valve 30.

The supply valve 30 and the exhaust valve 29 operate as a unit on a common stem 31 which is positioned by movement of the multisection body 26. This results in the exhaust valve 29 and the supply valve 30 being operated to develop or establish a loading pressure in the first loading chamber 16.

As apparent from FIG. 2 air pressure not only enters the first loading chamber 16 but also enters the nozzle chamber 19, and the setpoint chamber 17 through individual restricted connections. There is also a restricted connection to the first loading chamber 16. These restricted passages are formed by orifies 32, 33 and 34. By properly sizing the orifice 34 the supply pressure is continuously bled to the first load chamber 16 to provide dynamic seating of the exhaust valve 29. Dynamically seating the exhaust valve 29 permits this valve to continually float always ready for instant response. In operation the small amount of air bled through the orifice 34 keeps exhaust valve 29 slightly off its seat as required to maintain equilibrium.

Orifice 32 creates a restricted passage between the air supply source and the nozzle chamber 19. The pressure established in chamber 19 is determined by the distance of the vane 11 from the nozzle 12. Therefore, for a change in the vane-nozzle relationship there will occur a change of pressure in the nozzle chamber 19.

Orifice 33 forms a similar restricted passage between the air supply source and the setpoint chamber 17. The pressure established in the setpoint chamber 17 is determined by the supply pressure, the size of the orifice 33 and the size of the setpoint orifice 35. With a 3 to 27 p.s.i. signal range the normal supply pressure is 30 p.s.i., at other signal ranges different supply pressures are used. For example, on a 3 to 15 p.s.i. signal range the normal supply pressure is 20 p.s.i. When the amplifier is used on different supply pressures only the setpoint orifice 35 is resized.

There remains to be considered the second loading chamber 20. This chamber is connected to the first loading chamber 16 through an internal passage 36, in which is located an orifice 37. Passage 36 therefore forms a restricted passage between the first loading chamber 16 and the second loading chamber 20 introducing a reset action in that a change of pressure in nozzle chamber 19 causes an immediate and proportional change in pressure in loading chamber 16 the effect of which is gradually nullified as the pressure in chamber 20 changes. Under steady state conditions the pressure in the second loading chamber 20 is equal to the pressure in the first loading chamber 16 because of passage 36. A pressure developed in the second loading chamber 20 exerts a force on the multisection body 26 in the opposite direction as that of the loading chamber 16.

A fast change of pressure in the nozzle chamber 19 produces a relatively small change in the first loading chamber 16 because the time delay through passage 36 does not permit the developing of a pressure in the second loading chamber 20 to assist in producing a high gain. Correspondingly, a slow change of pressure in the nozzle chamber 19 produces a relatively large change in the first loading chamber 16 because the delay through passage 36 does not prevent a pressure to develop in the second loading chamber 20, this chamber then assists in opening the supply valve 30 resulting in a high gain output.

Description of operation

To describe the complete operation and function of the various parts and assemblies in my amplifier reference will be made to FIG. 1 and FIG. 2. Broadly speaking the amplifier works on a balance of forces. These forces being the result of various pressures developed in the different chambers. Specifically the force exerted in the setpoint chamber 17 is downward on the multisection body 26 and under balanced conditions an equal but opposite force is exerted upward as a result of pressure in the nozzle chamber 19. The force created by the pressure in the first loading chamber 16 is also downward on the multisection body 26 and this force is opposed by a force exerted upward by the pressure in the second loading chamber 20. The areas being subjected to pressure being equal in chambers 17 and 19 and likewise the areas in chambers 16 and 20 are equal. Therefore, under a balanced condition the pressure in nozzle chamber 19 must equal the pressure in the setpoint chamber 17.

Referring again to FIG. 1, if a differential change occurs across the orifice 6, the diaphragm 7 displaces the force beam 9 and the relationship between the vane 11 and the nozzle 12 changes. Assuming the change moves the vane closer to the nozzle then the pressure in the nozzle chamber 19 will increase causing an unbalance of forces in the amplifier 13.

The resultant unbalance of forces on the multisection body 26 causes the floating exhaust valve 29 to close and the supply valve 30 to open. As the supply valve 30 opens the pressure in the first loading chamber 16 increases. As the pressure in the first loading chamber 16 increases the pressure in the second loading chamber 20 also increases at the same rate, although somewhat delayed in time, as explained previously. The unbalance of forces continues so long as the pressure in the nozzle chamber 19 is off normal.

As the pressure in the first loading chamber 16 increases and as this pressure is transmitted to the feed back bellows 14, of FIG. 1, the force exerted on the force beam 9 is increased. An increase in force on the force beam 9 causes this beam to return to its original position thereby returning the vane-nozzle relationship to its original condition. When the vane 11 returns to its normal position with respect to the nozzle 12 the pressure in the nozzle chamber 19 returns to its normal operating level. This results in a balance of forces on the multisection body 26 which in turn results in closing the supply valve 30 and returning the exhaust valve 29 to its floating position.

Since the output pressure of the amplifier equals the pressure in the first loading chamber 16 a new output pressure is now established. The level of this pressure will be determined by the amount of force required to reposition the force beam 9. This new level of output pressure will be maintained until the differential across the orifice 6 changes.

If the next change in the differential causes the force beam 9 to move the vane 11 away from the nozzle 12 the pressure in the nozzle chamber 19 decreases. Again an unbalance of forces exists on the multisection body 26 which is in a direction that will open the exhaust valve 29 keeping the supply valve 30 closed. The pressure in the loading chambers 16 and 20 will exhaust to the atmosphere through the exhaust chamber 18. This will lower the output pressure of the amplifier 13 and reduce the force exerted by the feedback bellows 14 on the force beam 9. As a result of this decrease in force the force beam 9 will return to its steady state position thereby returning the vane 11 to its original space relationship with the nozzle 12. The forces exerted on the multisection body 26 will again be balanced and a new amplifier output pressure will be established.

It should now be apparent that any unbalance of forces in the amplifier causes the output pressure to change. It should also be apparent that this balance of forces must be independent of supply pressure to have an amplifier which is unaffected by supply pressure variations. As explained previously, when the amplifier forces are balanced the force exerted by the pressure in the setpoint chamber 17 is equal to the force exerted by the pressure in the nozzle chamber 19. It is these forces which must vary equally to maintain an amplifier balance independent of supply pressure.

The use of the setpoint chamber 17 accomplishes the desired result, that is an amplifier independent of supply pressure variations. The pressure in this chamber is determined by orifice 33, setpoint orifice 35 and the supply pressure. The pressure in chamber 19 is determined by orifice 32, relative positions of nozzle 12 and vane 11, and the supply pressure. As orifices 32 and 33 are of equal size, at a predetermined constant supply pressure a nozzle-vane relationship under static conditions is established so that the effective area of nozzle 12 is equal to the area of orifice 35 and equal pressures will exist in chambers 17 and 19. Thereafter so long as the supply pressure remains constant, the pressure in chamber 17 will remain constant and only changes in the relative positions of nozzle 12 and vane 11 will cause changes in pressure within chamber 19. If however there is a change in supply pressure, pressures in chambers 19 and 17 will change in equal amounts and as these pressures act in opposition there will be no change in position of the multisection body 26 and hence no change in pressure transmitted to the feedback bellows 14.

While I have illustrated and described a preferred embodiment of my invention, this by way of example only.

What I claim as new and desire to secure by Letters Patent of the United States is:

1. An amplifier relay for a vane and nozzle fluid pressure couple, comprising in combination, a first chamber having a first pressure sensitive movable wall, a supply and an exhaust valve for admitting pressure fluid to and exhausting pressure fluid from said chamber positioned by said movable wall, a second chamber having a second pressure sensitive movable wall operatively connected to the first pressure sensitive movable wall to assist the first pressure sensitive movable wall in positioning said supply and exhaust valves, a restricted connection between a source of fluid pressure and said second chamber, a restricted connection between said second chamber and the atmosphere, a third chamber having a third pressure sensitive movable wall operatively connected to the first pressure sensitive movable wall to oppose the first pressure sensitive movable wall in positioning said supply and exhaust valve, a restricted connection between the source of fluid pressure and said said third chamber and a connection between said third chamber and the nozzle of the control couple.

2. An amplifier relay for a vane and nozzle fluid pressure couple, comprising in combination, a first chamber having a first pressure sensitive movable wall, a supply and an exhaust valve for admitting pressure fluid to and exhausting pressure fluid from said chamber positioned by said movable wall, a second chamber having a second pressure sensitive movable wall operatively connected to the first pressure sensitive movable wall to assist the first pressursrse sensitive movable wall in positioning said supply and exhaust valves, a restricted connection between a source of fluid pressure and said second chamber, a restricted connection between said second chamber and the atmosphere, a third chamber having a third pressure sensitive movable wall operatively connected to the first pressure sensitive movable wall to oppose the first movable wall in positioning said supply and exhaust valves, a restricted connection between the source of fluid pressure and said third chamber, a connection between said third chamber and the nozzle of the control couple, a fourth chamber having a fourth pressure sensitive movable wall operatively connected to the first movable wall and a restricted connection between the first and fourth chambers.

3. The amplifier relay of claim 2 wherein a restricted passage is provided around the exhaust valve for dynamically seating the exhaust valve.

References Cited by the Examiner

UNITED STATES PATENTS 2,974,674   3/1961   Baldridge _____ 137—85

FOREIGN PATENTS 125,951   4/1959   Russia.

WILLIAM F. O'DEA, *Primary Examiner.*

ISADOR WEIL, *Examiner.*

A. COHAN, *Assistant Examiner.*